(12) United States Patent
Lin et al.

(10) Patent No.: US 8,400,602 B2
(45) Date of Patent: Mar. 19, 2013

(54) PIXEL UNIT, LCD PANEL, AND METHOD FOR FORMING THE SAME

(75) Inventors: Pei Lin, Shenzhen (CN); Chengming He, Shenzhen (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 280 days.

(21) Appl. No.: 13/000,376

(22) PCT Filed: Dec. 7, 2010

(86) PCT No.: PCT/CN2010/079540
§ 371 (c)(1),
(2), (4) Date: Dec. 21, 2010

(87) PCT Pub. No.: WO2012/068747
PCT Pub. Date: May 31, 2012

(65) Prior Publication Data
US 2012/0127411 A1 May 24, 2012

(30) Foreign Application Priority Data

Nov. 24, 2010 (CN) .......................... 2010 1 0559903

(51) Int. Cl.
*G02F 1/1343* (2006.01)
(52) U.S. Cl. ............................ 349/139; 349/38; 349/39
(58) Field of Classification Search .................. 349/139, 349/38, 39
See application file for complete search history.

(56) References Cited

U.S. PATENT DOCUMENTS
2007/0030432 A1* 2/2007 Chen et al. .................... 349/141

FOREIGN PATENT DOCUMENTS
| CN | 1704831 A | 12/2005 |
|----|-----------|---------|
| CN | 1945838 A | 4/2007 |
| CN | 101419368 A | 4/2009 |
| CN | 101526704 A | 9/2009 |
| CN | 101598872 A | 12/2009 |

* cited by examiner

*Primary Examiner* — Mike Qi
(74) *Attorney, Agent, or Firm* — Ditthavong Mori & Steiner, P.C.

(57) ABSTRACT

The present invention discloses a pixel unit, a liquid crystal display panel and method for forming the same. The liquid crystal display panel comprises a common line, a first shading line, and a second shading line, all of which are under the pixel electrode and are formed by a metallic layer. A lateral side of the first or second shading line, which is not covered by the pixel electrode is a curve edge. The curve first or second shading line expands an area of the common line, resulting in an increase of a storage capacitor. Even if a G/D overlay tolerance exists during the process of forming an LCD panel, a problem of uneven display brightness occurring in the LCD panel is still being improved.

18 Claims, 7 Drawing Sheets

PIXEL UNIT, LCD PANEL, AND METHOD FOR FORMING THE SAME

BACKGROUND OF THE INVENTION

1. Field of the Invention

The present invention relates to a pixel unit, a liquid crystal display (LCD) panel, and method for forming the same, and more particularly, to a pixel unit, an LCD panel, and method for forming the same for improving the problem of uneven display brightness due to a G/D overlay tolerance between a gate electrode (GE) layer and a source/drain electrode (SD) layer.

2. Description of Prior Art

A monitor with multiple functions is a key element for use in current consumer electronic products. The demand for the novelty and colorful monitors with high resolution, e.g., liquid crystal displays (LCDs), are indispensable components used in various electronic products such as monitors for notebook computers, personal digital assistants (PDAs), digital cameras, and projectors.

While the size of an LCD panel becomes larger, a mura phenomenon due to uneven brightness in a panel occurs more frequently than ever. Currently two main types of forming processes for LCD panels exist: a four-mask process and a five-mask process. The four-mask process has gradually become the mainstream owing to its short production cycle time and high rates of capacity utilization. However, the four-mask process is more complicated in alignment than the five-mask process, so it is more difficult to achieve high standards of production yields now for the four-mask process.

Currently, an LCD panel formed by using a four-mask process undergoes the following steps: At First, a metallic layer on a glass substrate is exposed and etched through a first mask to form a gate electrode (GE) layer of a switch unit. Next, an isolation layer and an active layer are formed on the GE layer. Subsequently, another metallic layer is deposited on the isolation layer and the active layer. At last, the metallic layer is exposed and etched through a second mask to form a source/drain electrode (SD) layer of the switch unit and a data line. Nowadays, the industry primarily utilizes a mask aligner to adopt a so-called mix-and-match approach to enhance capacity utilization. That is to say, while the GE layer and the SD layer are being formed, the metallic layers are exposed by different mask aligners, respectively. But, due to different processes in the utilization of different mask aligners, a tolerance in a G/D overlay between the GE layer and the SD layer tends to occur, causing a local shift in patterns to happen more frequently.

Figure 1:
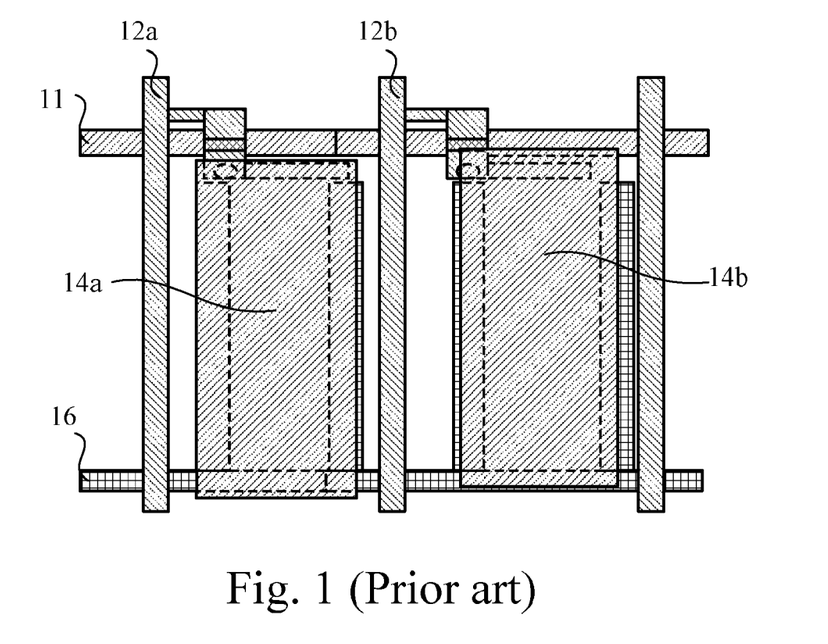
FIG. 1 and FIG. 2 illustrate schematic diagrams of a shift of formed data lines relatively to pixel electrodes.
Figure 2:
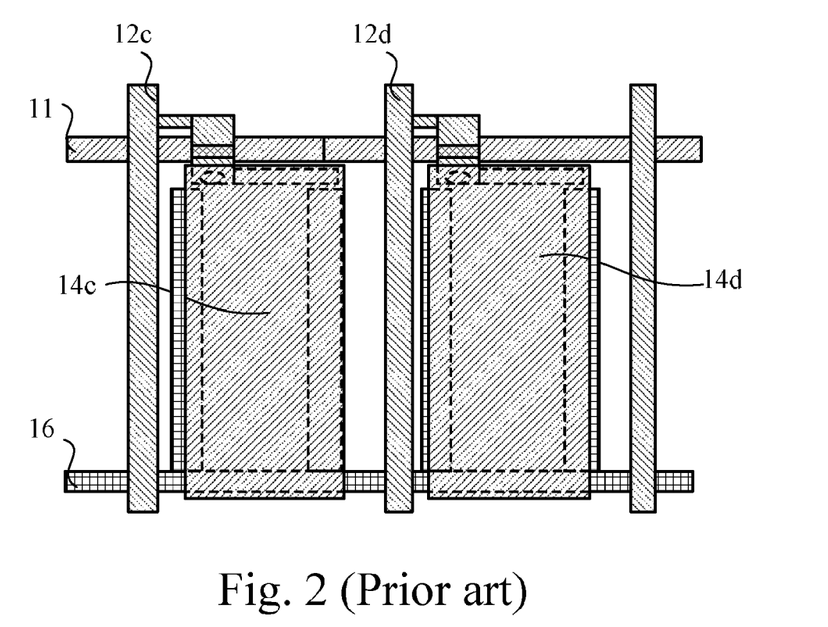
Figure 3:
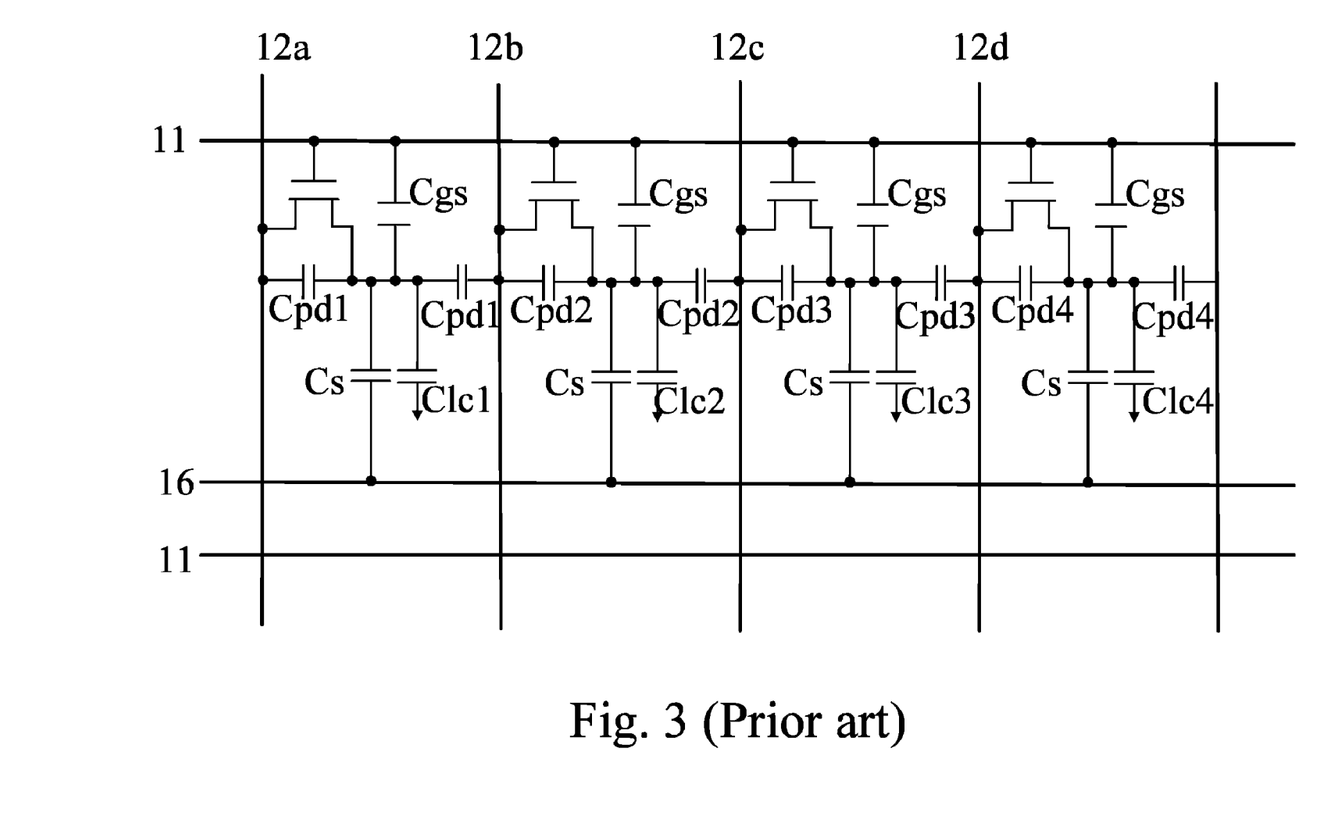
FIG. 3 is an equivalent circuit diagram of a combination of FIG. 1 and FIG. 2.

Please refer to FIGS. 1 through 3. FIG. 1 and FIG. 2 illustrate schematic diagrams of a shift of formed data lines relatively to pixel electrodes. FIG. 3 is an equivalent circuit diagram of a combination of FIG. 1 and FIG. 2. For the pixel electrodes 14a and 14b disposed on the same scan line 11, as shown in FIG. 1, the distance between the data line 12b and the pixel electrode 14b appears left shifted compared with the distance between the data line 12a and the pixel electrode 14a. So a coupling capacitor Cpd2 between the data line 12b and the pixel electrode 14b is larger than a coupling capacitor Cpd1 between the data line 12a and the pixel electrode 14a, as shown in FIG. 3. Although a data voltage which the data line 12a feeds into the pixel electrode 14a is consistent with a data voltage which the data line 12b feeds into the pixel electrode 14b, a charging voltage of the pixel electrode 14b is smaller than a charging voltage of the pixel electrode 14a, practically, so that the deflection polarity of liquid crystals (LCs) between an LC capacitor Clc1 and an LC capacitor Clc2 is not consistent. Accordingly, a gray level of the pixel electrode 14b is brighter than a gray level of the pixel electrode 14a. Relatively, for pixel electrodes 14c and 14d disposed on the same scan line 11, as shown in FIG. 2, the distance between the data line 12d and the pixel electrode 14d appears right shifted compared with the distance between the data line 12c and the pixel electrode 14c. So a coupling capacitor Cpd4 between the data line 12d and the pixel electrode 14d is smaller than a coupling capacitor Cpd3 between the data line 12c and the pixel electrode 14c, as shown in FIG. 3. Although a data voltage which the data line 12c feeds into the pixel electrode 14c is consistent with a data voltage which the data line 12d feeds into the pixel electrode 14d, a charging voltage of the pixel electrode 14d is larger than a charging voltage of the pixel electrode 14c, practically, so that the deflection polarity of liquid crystals (LCs) between an LC capacitor Clc3 and an LC capacitor Clc4 is not consistent. Accordingly, a gray level of the pixel electrode 14d is darker than a gray level of the pixel electrode 14c. In other words, if the GE layer and the SD layer have a slight tolerance in a G/D overlay, a problem of uneven display brightness may occur in an LCD panel.

It is necessary to consider the following capacitors for each pixel capacitor Cpix: an LC capacitor Clc, a storage capacitor Cs between a pixel electrode 14 and a common line 16, a parasitic capacitor Cgs between a gate and a source of a switch unit, and a coupling capacitor Cpd between a data line and a pixel electrode 14. As described above, a G/D overlay tolerance tends to cause a coupling capacitor Cpd to change. Besides, each pixel capacitor Cpix is a sum of the LC capacitor Clc, the storage capacitor Cs, the parasitic capacitor Cgs, and the coupling capacitor Cpd (i.e., Cpix=Clc+Cs+Cgs+Cpd). So, the more a ratio Q of the coupling capacitor Cpd to the pixel capacitor Cpix is, the more uneven display brightness in an LCD panel caused by a G/D overlay tolerance tends to becomes. Therefore, the industry needs to put effort into improving the problem of uneven display brightness due to change in the coupling capacitor Cpd caused by a G/D overlay tolerance.

SUMMARY OF THE INVENTION

In one aspect of the present, a pixel unit electrically connected to a switch unit comprises a pixel electrode, a common line, a first shading line, and a second shading line. A common line under the pixel electrode is used for supplying a common voltage. A first shading line and a second shading line are under the pixel electrode and connected to the common line. At least one lateral side of the first shading line and the second shading line is a curve edge, and the first shading line, the second shading line, and the common line are formed by a metallic layer.

In another aspect of the present, a liquid crystal display panel comprising a switch unit, a pixel electrode electrically connected to the switch unit, a pixel electrode, a common line, a first shading line, and a second shading line. A common line under the pixel electrode is used for supplying a common voltage. A first shading line and a second shading line are under the pixel electrode and connected to the common line. At least one lateral side of the first shading line and the second shading line is a curve edge, and the first shading line, the second shading line, and the common line are formed by a metallic layer.

In still another aspect of the present invention, a method of forming a liquid crystal display panel comprises the steps of: providing a glass substrate; etching a first metallic layer formed on the glass substrate to form a gate of a thin film transistor, a common line, a first shading line, and a second shading line, the first shading line and the second shading line being a curve edge; depositing an isolation layer, an active layer, an ohmic contact layer, and a second metallic layer on the glass substrate and the first metallic layer in sequence; simultaneously etching the active layer, the ohmic contact layer, and the second metallic layer to form an opening on top of the active layer and over the gate and to form a source and a drain of the thin film transistor; depositing a passivation layer on the second metallic layer and the isolation layer; etching the passivation layer to form a via hole over the gate; depositing a transparent conducting layer on the passivation layer and the via hole; and etching the transparent conducting layer to form a pixel electrode connected to the drain.

In yet another aspect of the present invention, a lateral side of the first or second shading line, which is not covered by the pixel electrode is a curve edge.

In yet another aspect of the present invention, a lateral side of the first or second shading line, which is not covered by the pixel electrode, is a triangular-waveform-like edge or a square-waveform-like edge.

In yet another aspect of the present invention, a lateral side of the first or second shading line, which is not covered by the pixel electrode, is asymmetrical to another lateral side of the first or second shading line, which is covered by the pixel electrode.

In contrast to the prior art, when a first metallic layer of the LCD panel in the present invention is etched, a gate of a switch unit, a common line, a first shading line, and a second shading line are formed on the first metallic layer. The common line is electrically connected to the first shading line and the second shading line, so that the first shading line, the second shading line, and the common line all serve as a bottom electrode plate of a storage capacitor simultaneously. The curved first and second shading lines connected to the common line increase not only the area of the bottom electrode plate but also the area of the storage capacitor.

These and other features, aspects and advantages of the present disclosure will become understood with reference to the following description, appended claims and accompanying figures.

DETAILED DESCRIPTION OF THE PREFERRED EMBODIMENTS

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Figure 4:
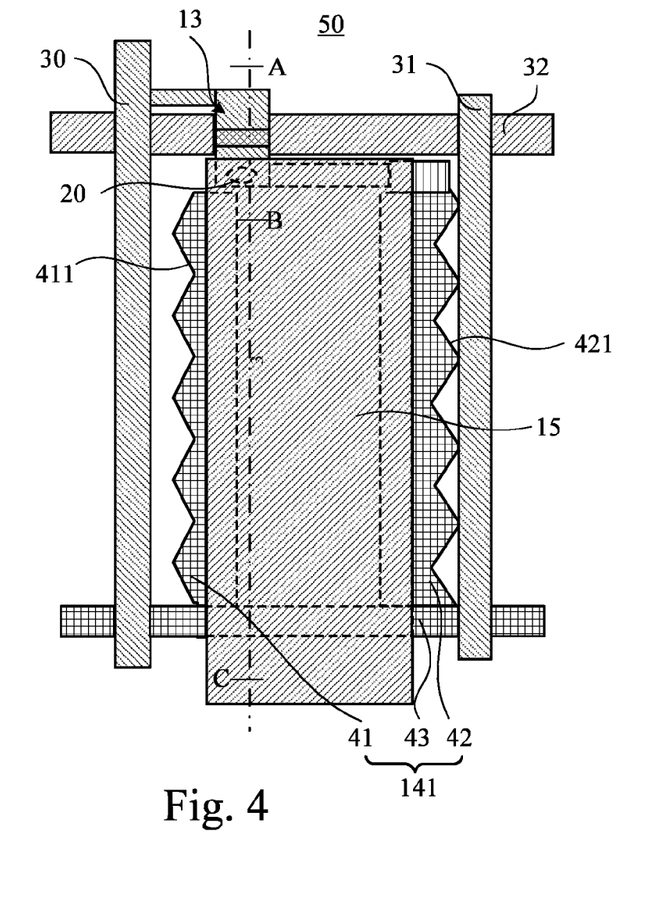
FIG. 4 is a schematic diagram of a pixel unit of a LCD panel according to a first embodiment of the present invention.

Refer to FIG. 4, which is a schematic diagram of a pixel unit 50 of a LCD panel according to a first embodiment of the present invention. The LCD panel comprises a plurality of pixel units 50. Each of the pixel units 50 comprises a switch unit 13 and a pixel electrode 15. The switch unit 13 can be a thin-film transistor (TFT) or any other unit having a switch function. When a scan voltage is applied to the switch unit 13 through a scan line 32, a data voltage from a data line 30 is transmitted to the pixel electrode 15 through the switch unit 13. The voltage difference of the data voltage transmitted to the pixel electrode 15 determines a rotation direction of LC molecules so as to determine the transmittance of light beams. A first shading line 41 and a second shading line 42 are connected to a common line 43. The first and second shading lines 41 and 42 and the common line 43 are all formed by the same metallic layer. A process of the formation of the pixel unit 50 is provided as follows.

Please refer to FIGS. 5 through 8, which illustrate schematic diagrams of forming an LCD panel 100 with four mask processes according to the present invention. Each of the figures stands for a mask process; that is, the LCD panel 100 needs to undergo a four-mask process to be finished.

Figure 5:
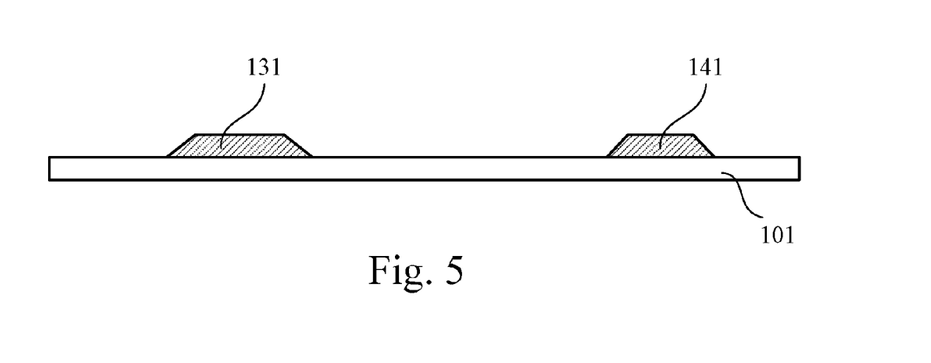
FIGS. 5 through 8 illustrate schematic diagrams of forming an LCD panel with four mask processes according to the present invention.

Refer to FIG. 5. During this stage of the process, firstly, a first metallic layer (not shown) is deposited on a glass substrate 101. Meanwhile, a developing process is conducted through a first mask. The developing process contains the following steps: coating a photoresist (not shown) on the first metallic layer, exposing the photoresist through the first mask having a specific pattern with a mask aligner, and then washing out the exposed photoresist with a developer. Afterwards, the first metallic layer undergoes an etching process. The etching process includes the steps of removing the first metallic layer which is not covered by the photoresist with a strong acid, forming a gate 131 of the switch unit 13 and a bottom electrode plate 141 on the first metallic layer (roughly showing the specific pattern) covered with the photoresist, and then washing out the residual photoresist. The bottom electrode plate 141 comprises the common line 43, the first shading line 41, and the second shading line 42 (shown in FIG. 4.). Because the gate 131 is formed during this stage of the process, all elements formed by etching the first metallic layer through the same mask belong to a GE layer.

Figure 6:
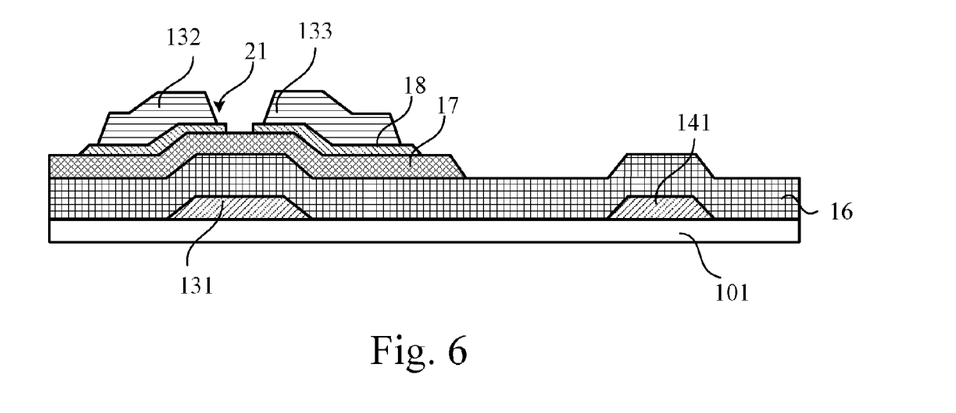

Refer to FIG. 6. During this stage of the process, firstly, an isolation layer 16 is deposited. Secondly, an active layer 17 is deposited. Thirdly, an ohmic layer 18 is deposited. Finally, a second metallic layer (not shown) is deposited. Subsequently, a developing process is conducted through a second mask. Meanwhile, the active layer 17, the ohmic contact layer 18, and the second metallic layer undergo an etching process. During this stage of the process, the ohmic contact layer 18 and the second metallic layer on the top of the gate 131 are removed, and an opening 21 and a drain 132 and a source 133 of the switch unit 13 are formed. Because the drain 132 and the source 133 are formed during this process, all elements formed by etching the second metallic layer through the same mask belong to a SD layer. It is notified that, the GE layer and the SD layer can be exposed using a single mask aligner or different mask aligners.

Figure 7:
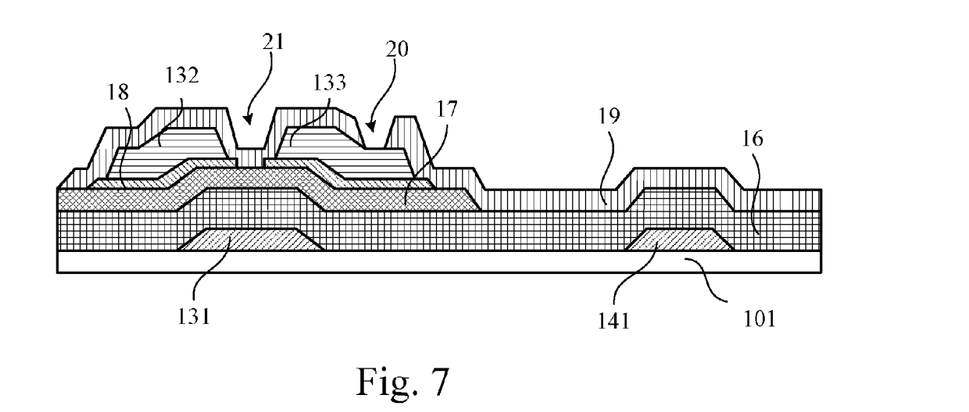

Refer to FIG. 7. During this stage of the process, firstly, a passivation layer 19 is deposited. Next, a developing process is conducted through a third mask. Meanwhile, the passivation layer 19 undergoes an etching process to form a via 20 on the source 133.

Figure 8:
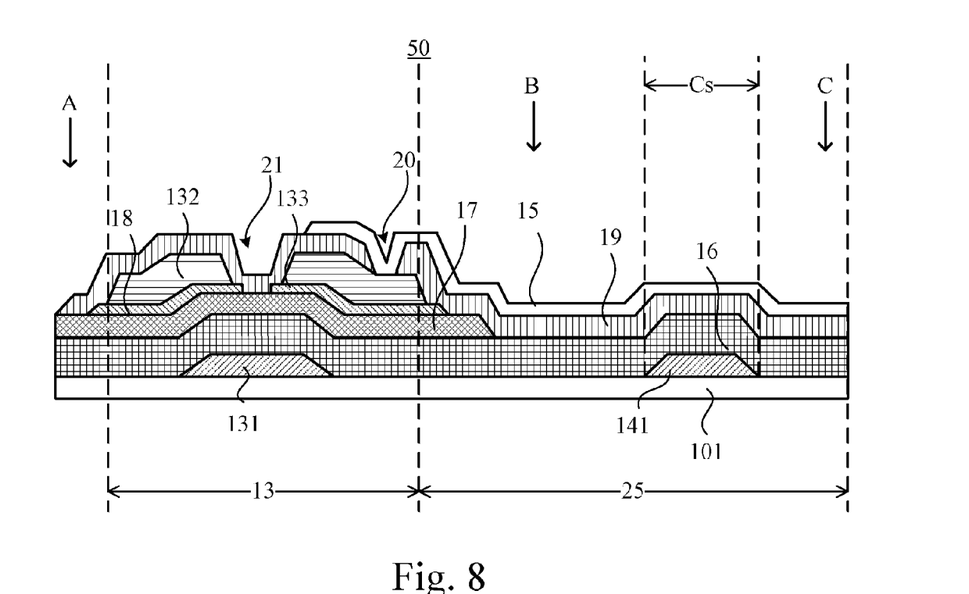

At last, please refer to FIG. 8. During this stage of the process, firstly, a transparent conducting layer is deposited. Next, a developing process is conducted through a fourth mask. Meanwhile, the transparent conducting layer undergoes an etching process to form a pixel electrode 15.

Refer to FIG. 4 and FIG. 8. FIG. 8 is a cross section view along a line from point A to point B to point C in FIG. 4. As FIG. 8 shows, between point A and point B, the gate 131 of the switch unit 13 is formed by the first metallic layer (i.e., GE layer), and the drain 132 and source 133 of the switch unit 13 are formed by the second metallic layer (i.e., SD layer). Between point B and point C, the bottom electrode plate 141 is also formed by the first metallic layer. A storage capacitor Cs is formed by an overlap of the pixel electrode 15 and the bottom electrode plate 141. The first shading line 41 and the second shading line 42 are connected to the common line 43, so the first and second shading lines 41 and 42 and the common line 43 maintain the same voltage level. Because the first and second shading lines 41 and 42 and the common line 43 maintain the same voltage level, each of them can be regarded as a part of the bottom electrode plate 141. Moreover, one lateral side 411 of the first shading line 41 and one lateral side 421 of the second shading line 42, both of which are near to the data line 30 and the data line 31, respectively, are a curve edge. Preferably, each of the lateral side 411 and the lateral side 421 is an edge with a triangular-waveform-like line, and the lateral side 411 and the lateral side 421 are asymmetrical. The bottom electrode plate 141 comprises the common line 43, the shading line 41 having the curve lateral side 411, and the shading line 42 having the curve lateral side 421. The total area of the bottom electrode plate 141 is larger than that of the combination of the linear shading lines and the common line (as shown in FIG. 1 and FIG. 2). The storage capacitor Cs is formed by an overlap of the pixel electrode 15 and the bottom electrode plate 141. Therefore, the larger the area of the bottom electrode plate 141 is, the higher the capacitance of the storage capacitor Cs becomes.

Figure 9:
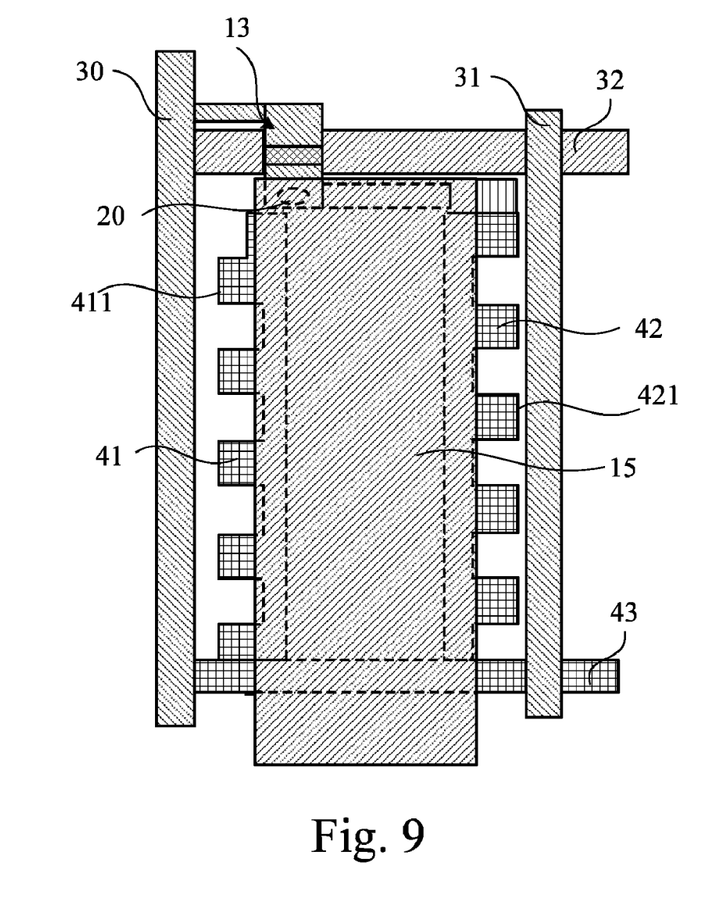
FIG. 9 is a schematic diagram of the pixel unit of the LCD panel according to a second embodiment of the present invention.
Figure 10:
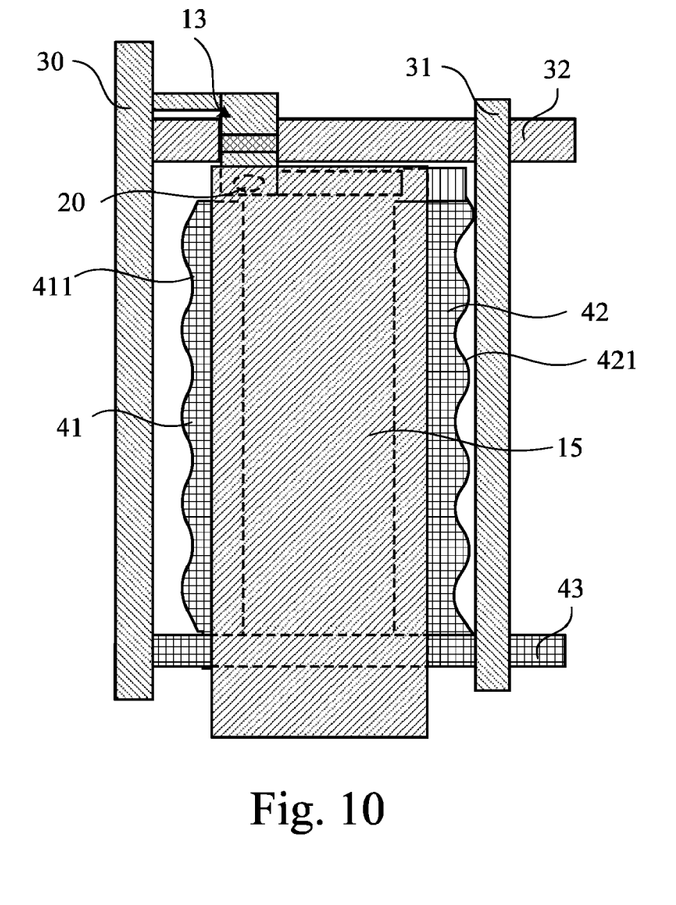
FIG. 10 is a schematic diagram of the pixel unit of the LCD panel according to a third embodiment of the present invention.

Refer to FIG. 9 and FIG. 10. FIG. 9 is a schematic diagram of the pixel unit 50 of the LCD panel according to a second embodiment of the present invention. FIG. 10 is a schematic diagram of the pixel unit 50 of the LCD panel according to a third embodiment of the present invention. The curve lateral sides 411 and 421 are not restricted to be triangular-waveform-like edges. As shown in FIG. 9, the lateral side 411 of the first shading line 41 and the lateral side 421 of the second shading line 42 display a square-waveform-like edges. As shown in FIG. 10, the lateral side 411 of the first shading line 41 and the lateral side 421 of the second shading line 42 are undulation-like edges.

With regard to the LCD panel 100 and method for forming the same of the present invention, the gate 131 of the switch unit 13, the common line 43, the first shading line 41, and the second shading line 42 are simultaneously formed when the first metallic layer is etched. The common line 43 is electrically connected to the first shading line 41 and the second shading line 42, so that the first and second shading lines 41 and 42 and the common line 43 all serve as the bottom electrode plate 141 of the storage capacitor Cs simultaneously. The shading line 41 having the curve lateral side 411 and the shading line 42 having the curve lateral side 421 are connected to the pixel electrode 15, so the area of the bottom electrode plate 141 of the storage capacitor Cs is increased, and the storage capacitor Cs is enlarged as well. In sum, because the storage capacitor Cs is enlarged, the ratio Q of the coupling capacitor Cpd to each pixel capacitor Cpix (Cpix=Clc+Cs+Cgs+Cpd) decreases. In other words, even if a G/D overlay tolerance still exists, the ratio Q of each of the pixel unit 50 tends to be decreased using the first shading line 41 and the second shading line 42 electrically connected to the common line 43 for enlarging the storage capacitor Cs. It represents that the impact of a G/D overlay tolerance on each of the pixel unit 50 is greatly reduced. Even if a G/D overlay tolerance still exists during the process of forming an LCD panel 100, a problem of uneven display brightness occurring in the LCD panel 100 is still being improved.

Although the present invention has been explained by the embodiments shown in the drawings described above, it should be understood to the ordinary skilled person in the art that the invention is not limited to the embodiments, but rather various changes or modifications thereof are possible without departing from the spirit of the invention. Accordingly, the scope of the invention shall be determined only by the appended claims and their equivalents.

What is claimed is:

1. A method of forming a liquid crystal display panel characterized in that:
   a glass substrate is provided;
   a first metallic layer formed on the glass substrate is etched to form a gate of a thin film transistor, a common line, a first shading line, and a second shading line, at least one lateral side of the first shading line and the second shading line being a curve edge;
   an isolation layer, an active layer, an ohmic contact layer, and a second metallic layer are deposited on the glass substrate and the first metallic layer in sequence;
   the active layer, the ohmic contact layer, and the second metallic layer are simultaneously etched to form an opening on top of the active layer and over the gate and to form a source and a drain of the thin film transistor;
   a passivation layer is deposited on the second metallic layer and the isolation layer;
   the passivation layer is etched to form a via hole over the drain;
   a transparent conducting layer is deposited on the passivation layer and the via hole; and
   the transparent conducting layer is etched to form a pixel electrode connected to the drain.

2. The method as claimed in claim 1 characterized in that a lateral side of the first or second shading line, which is not covered by the pixel electrode is a curve edge.

3. The method as claimed in claim 2 characterized in that a lateral side of the first or second shading line, which is not covered by the pixel electrode, is a triangular-waveform-like edge.

4. The method as claimed in claim 2 characterized in that a lateral side of the first or second shading lines, which is not covered by the pixel electrode, is a square-waveform-like edge.

5. The method as claimed in claim 2 characterized in that a lateral side of the first or second shading line, which is not covered by the pixel electrode, is an undulation-like edge.

6. The method as claimed in claim 1 characterized in that a lateral side of the first or second shading line, which is not covered by the pixel electrode, is asymmetrical to another lateral side of the first or second shading line, which is covered by the pixel electrode.

7. A pixel unit electrically connected to a switch unit characterized in that the pixel unit further comprises:
   a pixel electrode;
   a common line under the pixel electrode, for supplying a common voltage;
   a first shading line and a second shading line, under the pixel electrode and connected to the common line, wherein at least one lateral side of the first shading line and the second shading line is a curve edge, and the first shading line, the second shading line, and the common line are formed by a metallic layer.

8. The pixel unit as claimed in claim 7 characterized in that a lateral side of the first or second shading line, which is not covered by the pixel electrode is a curve edge.

9. The pixel unit as claimed in claim 8 characterized in that a lateral side of the first or second shading line, which is not covered by the pixel electrode, is a triangular-waveform-like edge.

10. The pixel unit as claimed in claim 8 characterized in that a lateral side of the first or second shading lines, which is not covered by the pixel electrode, is a square-waveform-like edge.

11. The pixel unit as claimed in claim 8 characterized in that a lateral side of the first or second shading line, which is not covered by the pixel electrode, is an undulation-like edge.

12. The pixel unit as claimed in claim 7 characterized in that a lateral side of the first or second shading line, which is not covered by the pixel electrode, is asymmetrical to another lateral side of the first or second shading line, which is covered by the pixel electrode.

13. A liquid crystal display panel comprising a switch unit and a pixel electrode electrically connected to the switch unit characterized in that the liquid crystal display panel further comprises:
a pixel electrode;
a common line under the pixel electrode, for supplying a common voltage;
a first shading line and a second shading line, under the pixel electrode and connected to the common line, wherein at least one lateral side of the first shading line and the second shading line is a curve edge, and the first shading line, the second shading line, and the common line are formed by a metallic layer.

14. The liquid crystal display panel as claimed in claim 13 characterized in that a lateral side of the first or second shading line, which is not covered by the pixel electrode is a curve edge.

15. The liquid crystal display panel as claimed in claim 14 characterized in that a lateral side of the first or second shading line, which is not covered by the pixel electrode, is a triangular-waveform-like edge.

16. The liquid crystal display panel as claimed in claim 14 characterized in that a lateral side of the first or second shading lines, which is not covered by the pixel electrode, is a square-waveform-like edge.

17. The liquid crystal display panel as claimed in claim 14 characterized in that a lateral side of the first or second shading line, which is not covered by the pixel electrode, is an undulation-like edge.

18. The liquid crystal display panel as claimed in claim 13 characterized in that a lateral side of the first or second shading line, which is not covered by the pixel electrode, is asymmetrical to another lateral side of the first or second shading line, which is covered by the pixel electrode.

* * * * *